(12) United States Patent
Hyun

(10) Patent No.: US 10,271,532 B2
(45) Date of Patent: Apr. 30, 2019

(54) BAITCAST REEL SPOOL HAVING REPLACEABLE PLATE

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 15/809,416

(22) Filed: Nov. 10, 2017

(65) Prior Publication Data

US 2018/0132465 A1    May 17, 2018

(30) Foreign Application Priority Data

Nov. 11, 2016  (KR) .................. 10-2016-0150322

(51) Int. Cl.
| *A01K 89/01* | (2006.01) |
| *A01K 89/015* | (2006.01) |
| *A01K 89/033* | (2006.01) |
| *A01K 89/0155* | (2006.01) |

(52) U.S. Cl.
CPC .. *A01K 89/01931* (2015.05); *A01K 89/01555* (2013.01); *A01K 89/046* (2015.05); *A01K 89/058* (2015.05)

(58) Field of Classification Search
CPC ............ A01K 89/0111; A01K 89/0113; A01K 89/01555; A01K 89/01923; A01K 89/01931; A01K 89/01928

See application file for complete search history.

(56) References Cited

U.S. PATENT DOCUMENTS

| 3,027,114 | A | * | 3/1962 | Grieten | ................ | A01K 89/033 242/270 |
| 4,586,674 | A | * | 5/1986 | Nakajima | ........ | A01K 89/01555 242/288 |
| 4,681,276 | A | * | 7/1987 | Sato | .................... | A01K 89/0193 242/249 |
| 4,805,849 | A | * | 2/1989 | Nanbu | ............. | A01K 89/01928 242/319 |
| 5,692,693 | A | * | 12/1997 | Yamaguchi | ...... | A01K 89/01555 242/288 |
| 6,045,073 | A | * | 4/2000 | Ikuta | .................... | A01K 89/059 242/260 |
| 2009/0206188 | A1 | * | 8/2009 | Sung | ................ | A01K 89/01555 242/288 |
| 2013/0161434 | A1 | * | 6/2013 | Sim | .................... | A01K 89/0155 242/244 |

FOREIGN PATENT DOCUMENTS

| JP | 11169032 | 6/1999 |
| JP | 4354848 | 10/2009 |
| KR | 200131873 | 12/1998 |

* cited by examiner

*Primary Examiner* — Emmanuel M Marcelo
(74) *Attorney, Agent, or Firm* — Cantor Colburn LLP

(57) ABSTRACT

Provided is a baitcast reel spool that provides a rotational braking force against a spool using a braking magnet to prevent backlash of the spool in casting, more particularly, to a baitcast reel spool having a replaceable plate, of which the plate that is attracted by a braking magnet can be easily, firmly, and safely attached to a side of the spool and can be easily detached so that a user can tune the reel by replacing the plate in accordance with his/her taste and necessity.

5 Claims, 5 Drawing Sheets

BAITCAST REEL SPOOL HAVING REPLACEABLE PLATE

CROSS REFERENCE TO RELATED APPLICATION

The present application claims priority to Korean Patent Application No. 10-2016-0150322, filed Nov. 11, 2016, the entire contents of which is incorporated herein for all purposes by this reference.

BACKGROUND OF THE INVENTION

Field of the Invention

The preset invention relates to a baitcast reel spool that provides a rotational braking force against a spool using a braking magnet to prevent backlash of the spool in casting. More particularly, the present invention relates to a baitcast reel spool having a replaceable plate, of which the plate that is attracted by a braking magnet can be easily, firmly, and safely attached to a side of the spool and can be easily detached so that a user can tune the reel by replacing the plate in accordance with his/her taste and necessity.

Description of the Related Art

In general, in casting with a bait casting reel for fishing (hereafter, referred to as a reel), the rotational speed of the spool that unwinds a fishing line is higher than the flying speed of a lure, so the carry distance of the lure is reduced or the fishing line becomes entangled. This phenomenon is called backlash.

In order to prevent such backlash, reels are equipped with a friction brake that uses physical friction and a magnet brake that uses magnetic attraction.

The friction brake has the maximum torque at the early stage of casting, generates friction using a brake shoe and a brake pad, which are brought in contact with each other by centrifugal force, and reduces the rotational speed of a spool and decreases also its braking force, as the torque is gradually decreased by the friction. Accordingly, the friction brake is advantageous in terms of long-distance casing, as compared with the magnet brake, but it has difficulty in fine adjustment of the braking force. Further, it is easily worn and makes large noise due to the friction between the brake shoe and the brake pad.

In order to solve this problem, a magnet brake, which is a non-contact type brake, unlike a friction brake, reduces the rotational speed of a spool by attracting a rotating spool using the magnetic force of a plurality of braking magnets on the reel body.

In order to use the magnet brake, a spool has to have sides having a predetermined size or more so that the magnetic force of the magnet brake can act thereon.

However, spools cannot have sides exceeding a predetermined size in some cases, depending on models.

That is, due to the shape of a spool, the diameter per unit length of a fishing line to be wound on a spool, and the weight reduction of a reel, it is difficult to form sides of a spool on which the magnetic force of a magnet brake can act in some cases.

In this case, there is a need for additionally attaching separate plates, to which magnetic force of a magnet brake can act, to the sides of a spool.

When there was a need for installing separate plates for magnetic braking, in the related art, plates were attached by an adhesive, fastened by fasteners such as bolts, or forcibly fitted in opening of a spool through pressing.

However, as for method of attaching a plate with an adhesive, when the adhesive is insufficient, the flatness of a plate is poor, or the area to be attached is small, plates cannot be firmly attached.

In particular, for the characteristics of adhesives, they are vulnerable to moisture and high heat, so there is a possibility of plates being easily separated, depending on the places where reels are used and kept. Further, the adhesion of adhesives is necessarily not sufficiently strong, so a spool having a fishing line wound thereon is deformed by tension of the fishing line and plates are easily separated.

As for the method of fastening a plate with fasteners, there is a need for spaces for inserting fasteners, so the size and weight of spools are increased, which is thus not suitable for recent tendency of light weight and down-sizing of reels.

As for the method of forcibly fitting a plate through pressing, there is also a need for a space for forcibly fitting a plate.

In particular, a spool and/or a plate may be deformed during pressing and such deformation of a part deteriorates concentricity of a spool.

That is, according to most reels, a spool is rotated with a shaft at a high speed of 40,000~50,000 rpm in casting, but when the concentricity of a spool is deteriorated by deformation of a part, the rotational balance is broken, so noise and vibration are increased or the casting distance is reduced.

In order to prevent this problem, plates for a spool have to be formed thick over a predetermined level, so it is also not suitable for the tendency of light, thin, and simple reels.

SUMMARY OF THE INVENTION

The present invention has been made in an effort to solve the problems and an object of the present invention is to provide a baitcast reel spool having a braking magnet, the spool includes a mounting ring for fixing a plate to an opening at a side of a spool body in order to more firmly and easily mount a plate that is attracted by a braking magnet, advantageously secure an area on the plate for magnetic braking, and satisfy the tendency of light, thin, and simple reels.

Another object of the present invention is to provide a baitcast reel spool, the spool including a plate having projections on the rim and a mounting ring having seats for fitting the projections therein to be able to prevent reduction of a magnetic braking force when the plate is rotated on the spool in casting.

Another object of the present invention is to provide a baitcast reel for spool having a replaceable plate, the spool allowing the plate to be easily replaced by having a spool body having locking grooves on the inner side of an opening thereof and a mounting ring having locking projections on the rim to be fitted in the locking groove to easily replace a plate so that a user can easily and quickly tune the reel for his/her taste and necessity by freely replacing the plate on the spool to correspond to his/her force for casting, a casting distance, and the characteristics of a cast.

Another object of the present invention is to provide a baitcast reel spool having a replaceable plate in which a mounting ring has pressed inclined-surfaces inclined upward and inward from the outer end to the root of the outer side and the inner ends of steps of locking grooves press the pressed inclined-surfaces to attach the plate so that when the plate is fixed by the mounting ring, the mounting ring keeps pressing the plate in order that the plate can be more firmly maintained in close contact with a spool body.

In order to achieve the object, a baitcast reel spool having a replaceable plate according to the present invention includes: a spool body having an opening at a side; a plate attached to the opening of the spool body to be attracted by a braking magnet; and a mounting ring attached to the opening of the spool body to cover a rim of the plate in order to fix the plate.

The plate may have projections formed around the rim, and the mounting ring may have seats to fit the projection therein, on an inner side coming in contact with the plate.

The spool body may have locking grooves formed on an inner side of the opening and the mounting ring may have locking projections formed on a rim to be locked into the locking groove, so the plate can be replaced by detaching the mounting ring from the spool body.

The locking projections each may have a pressed inclined-surface inclined upward and inward from an outer end to a joint of an outer side, and inner ends of steps of the locking grooves may press inward the pressed inclined-surface of the locking projections fitted in the seats, so the plate is in contact with the spool body by the mounting ring.

According to the baitcast reel spool of the present invention, the spool is advantageous in securing an area on the plate for magnetic braking by attaching the plate to the opening of the spool using the mounting ring, can be suitable for the tendency of light, thin, and simple reels, and prevent separation of the plate when the reel is used and kept by firmly maintaining the plate. Further, since the plate can be easily replaced, a user can tune a fishing reel in accordance with his/her taste or necessity by replacing the plate with other plates having different thicknesses, so the reel can be maintained in the optimal state.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
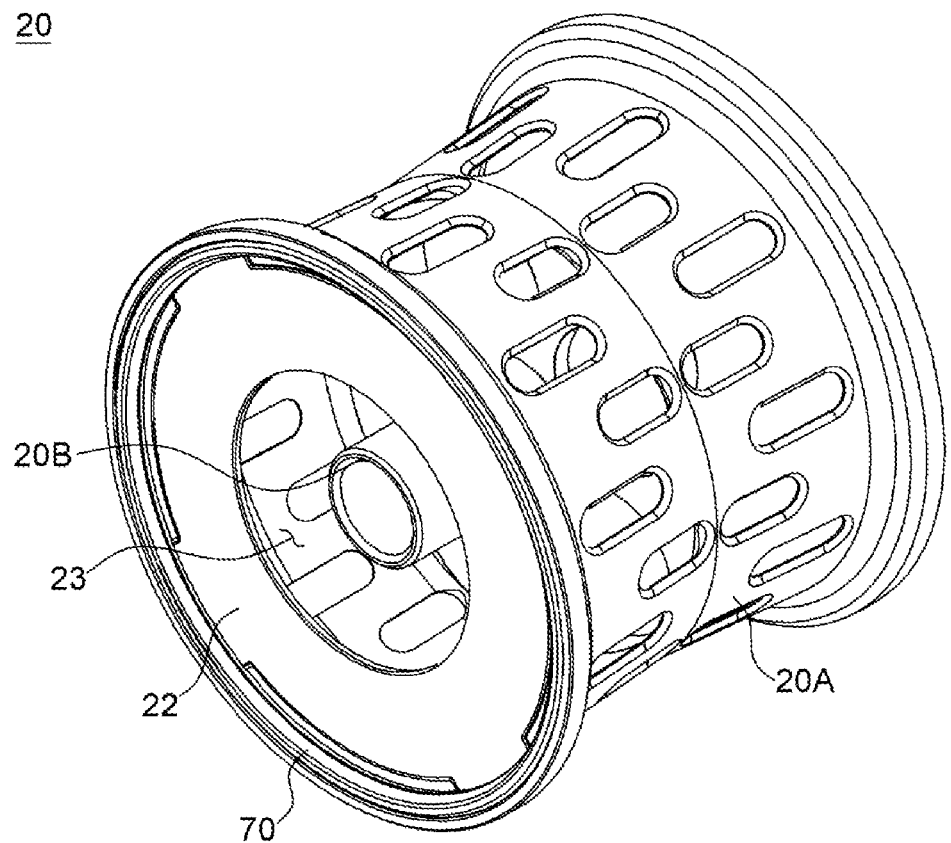
FIG. 1 is a perspective assembly view of a baitcast reel spool according to the present invention.

The present invention may be modified in various ways and may have various embodiments, and aspects (or embodiments) will now be described in detail. The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminologies used herein are for the purpose of describing particular aspects (or embodiments) only and are not intended to be limiting of the present invention. As used herein, the singular forms are intended to include the plural forms as well, unless the context clearly indicates otherwise.

It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from other constitutive element, but constitutive element should not be limited to a manufacturing order, and the terms described in the detailed description of the invention may not be consistent with those described in the claims In the following description of baitcast reel spool having a replaceable plate according to the present invention, directions are first defined not definitely, but approximately with reference to FIGS. 1 and 3, that is, the gravity direction is defined as the downward direction and "up", "down", "left", and "right" are defined as they are seen. Further, "inside" and "outside" are specified on the basis of the exposure direction of a side cover which is the "outside", and this definition is applied in the same way to description related to other figures and claims unless specifically stated.

Hereinafter, a baitcast reel spool having a replaceable plate according to the present invention is described with reference to the accompanying drawings.

The present invention relates to a spool 20 for a reel having a braking magnet 31 for preventing backlash of a fishing line.

Figure 3:
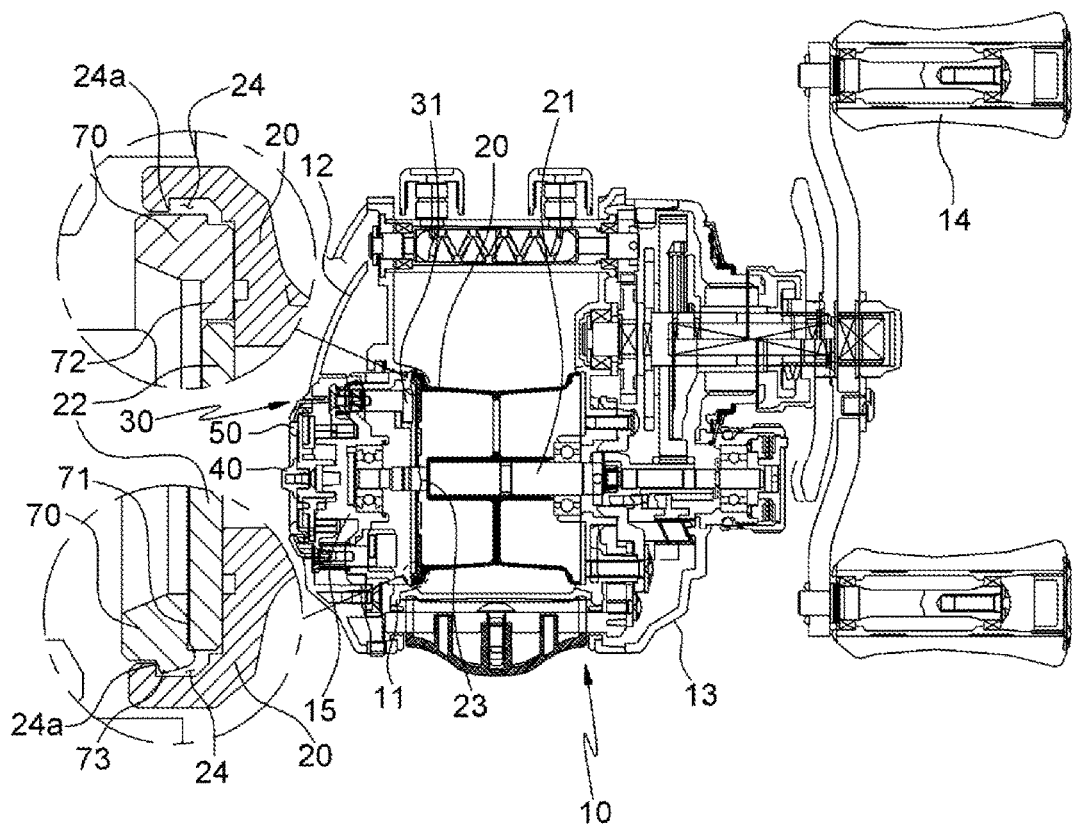
FIG. 3 is a cross-sectional view of a baitcast reel equipped with the spool according to the present invention.

As shown in FIG. 3, a reel on which a spool 20 according to the present invention can be mounted includes a reel body 10, the spool 20 for winding a fishing line thereon, an anti-backlash unit 30 having a braking magnet 31 that provides a braking force for reducing the rotational speed of the spool 20, and a braking dial 40 for adjusting the braking force of the braking magnet 31.

In the reel body 10, side covers 12 and 13 are coupled to both sides of a body frame 11, respectively, in which the first side cover 12 is detachably coupled to an opening at a side of the body frame 11 so that the spool 20 can be separated or replaced.

The anti-backlash unit 30 having the braking magnet 31, the braking dial 40 for moving the braking magnet 31 of the anti-backlash unit 30 left and right in the axial direction of the spool 20, and a zero-point indication dial 50 for zeroing the braking dial 40 are disposed at the first side cover 12, and a handle 14 for rotating the spool 20 is disposed at the second side cover 13.

In particular, a spool cover 15 having a central shaft hole is fixed to the inner side of the first side cover 12, so the first side cover 12 and the spool cover 15 are detachably attached together to the body frame 11.

When the braking dial 40 is rotated in both directions, the braking magnet 31 of the anti-backlash unit 30 between the first side cover 12 and the spool cover 15 is moved left and right axially on a spool shaft 21.

Further, a line releaser (so-called a level winder) is disposed on the front of the reel body 10, a manual brake (so-called a thumb bar or clutch bar) is disposed on the rear of the real body 10, and the reel includes other components of existing reels.

The spool 20 according to the present invention, which is rotatably mounted on the reel body 10 through a shaft, and as show in FIGS. 1 to 4 includes a spool body 20A on which a fishing line is wound and a shaft 21 is inserted in a sleeve 20B of the spool body 20A to allow the spool body 20A to rotate with the handle 14.

Both ends of the shaft 21 are inserted respectively in sleeves on the covers of the reel body 10.

The spool 20 can freely rotate when a fishing line is released for casting and a user can move a lure by winding or releasing the fishing line by rotating the handle 14 after casting.

Since the anti-backlash unit 30 has the braking magnet 31 inside the reel body 10 (in detail, inside the first side cover 12), a braking force for reducing the rotational speed of the spool 20 is provided by the magnetic force (attraction) that is applied to the spool body 20A from the braking magnet 31.

The present invention includes a plate 22 that can be detached from the spool body 20A and is attracted by the braking magnet 31 and the plate 22 can be detachably and firmly attached.

The spool body 20A has an opening 23 and the plate 22 is attached and fixed in the opening 23 by a mounting ring 23.

The plate 22 is made of metal that can be attracted to the braking magnet 31.

The mounting ring 70, which is made of synthetic resin such as plastic or metal that has predetermined elasticity, is forcibly fitted in the opening 23 of the spool body 20A to cover the rim of the plate 22, thereby fixing the plate 22.

The mounting ring 70 has a hole, so the plate 22 attached to the spool body 20A is exposed in a predetermined area or more.

The plate 22 has projections 22a on the rim.

The mounting ring 70 has seats 71 for fitting the projections 22a therein, on the inner side that is brought in contact with the plate 22.

The projections 22a are circumferentially arranged on the rim of the plate 22 and a total four projections 22 are shown in the figures.

Further, a total of four seats 71 are shown in the figures to correspond to the projections.

According to the present invention, as described above, since the plate 22 is attached not by an adhesive or bolts, the plate 22 does not idle in the opening 23 of the spool body 20A by fitting the projections 22a and the seats 71 to each other.

Reference numeral '72' not stated above indicate protrusions that form the seats 72 and are fitted on the rim of the plate 22.

The mounting ring 70 is also fitted to the spool body 20A not by an adhesive or bolts so that the plate 22 can be firmly attached and easily detached.

This structure is described in detail with reference to FIG. 3 (in which a protrusion 72 where a locking projection 73 is not formed is shown opposite to the locking protrusion 73 in the enlarged views for the convenience of understanding) and FIG. 4.

The spool body 20A has locking grooves 24 formed on the inner side of the opening 23.

The mounting ring 70 has the locking projections 73 that are locked in the locking grooves 24.

As the locking projections 73 of the mounting ring 70 are locked in the locking groove 24, the mounting ring 70 can prevent the plate 22 from separating.

In particular, since the mounting ring 70 can be detachably attached to the spool body 20A by the locking projections 73 and the locking grooves 24 that are locked to each other, the plate 22 can be replaceable.

That is, the braking magnet 31 should not come in contact with the plate 22 when a baitcast reel is used, but the braking magnet 31 may be worn or damaged by coming in contact with the plate 22 attached to the spool 20 when it is moved by the braking dial 40, so mounting ring 70 allows the plate 22 to be replaced.

In particular, since users may want different attraction of the braking magnet 31, that is, braking forces, users can freely tune a fishing reel by replacing the plate 22 with other plates having different thicknesses for their tastes or necessities.

In other words, the braking force of the braking magnet 31 depends on the distance between the braking magnet 31 and the plate 22 and users can adjust the distance between the braking magnet 31 and the plate 22 and the weight of a fishing reel (the spool 20) by adjusting the thickness of the plate 22, regardless of zeroing the braking magnet 31 using the braking dial 40. Accordingly, users can tune and use their fishing reels to correspond to their needs in avoidance to existing fishing reels having weights and braking forces set by manufactures.

The mounting ring 70 using the locking projections 73 and the locking grooves 24 for attachment is forcibly fitted by its elasticity.

Figure 4:
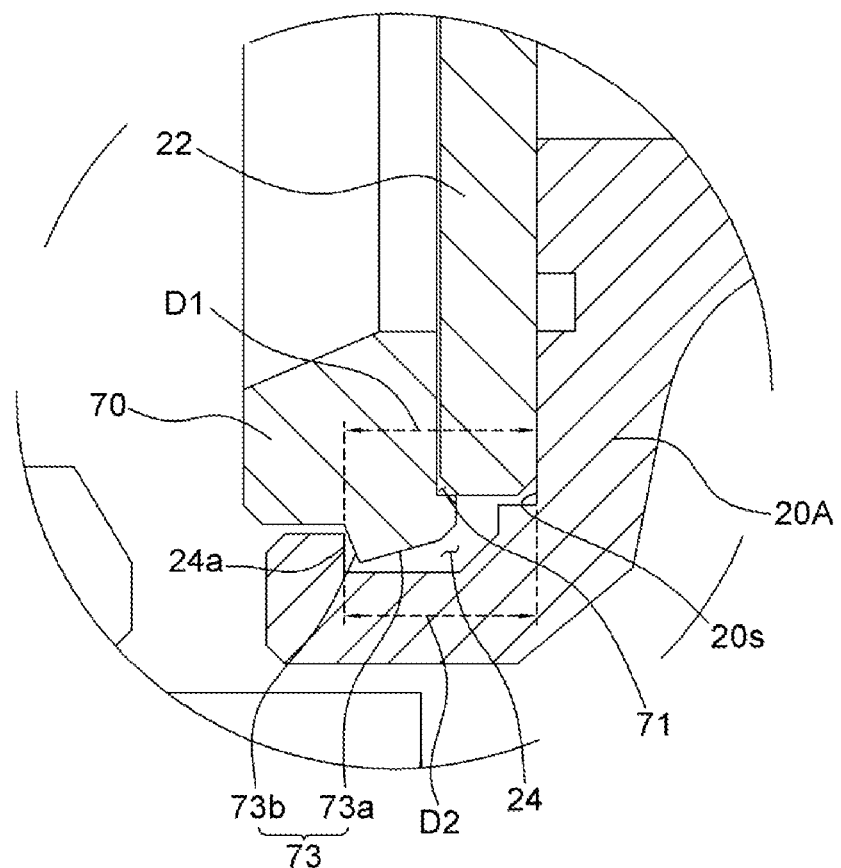
FIG. 4 is an exploded perspective view of main parts of the baitcast reel spool according to the present invention.

The locking projections 73 has a forcibly-fitted 73a inclined upward from the outer end to the inner end, on the inner side facing the spool body 20A, as shown in FIG. 4.

Accordingly, when the mounting ring 70 combined with the plate 22 is fitted into the opening 23 of the spool body 20A, the locking projection 73 slides over a step 24a of the locking groove 24 by elastically deforming with the forcibly-fitted inclined-surface 73 in contact with a step 24a. When the locking projection 73 is fitted in the locking groove 24, it is returned backward to the original shape and locked to the step 24a of the locking groove 24.

It can be seen that the forcibly-fitted inclined-surface 73 is curved with two steps in the figure.

Further, when the plate 22 can be replaced by the locking structure of the mounting ring 70 and the spool body 20A, the locking height between the locking projection 73 and the locking groove 24 necessarily depend on the thickness of the plate 22 and a change of the locking height may make attachment of the plate impossible or may loosen the plate 22. Accordingly, it is important to firmly attach and maintain the plate 22 using the mounting ring 70 regardless of the thickness of the plate 22.

That is, when the plate 22 is too thick, the locking projection 73 cannot be fitted into the locking groove 24, so the mounting ring 70 may not be attached. In contrast, when the plate 22 is too thin, a gap is generated between the locking projection 73 and the step 24a, so the mounting ring 70 is loosely fitted, whereby the plate 22 may not be attached in close contact with the spool body 20A.

Therefore, it is important to tightly fit the locking projection 73 of the mounting ring 70 into the locking groove 24 of the spool body 20A regardless of the thickness of the plate 22.

Accordingly, the locking projection 73 has a pressed inclined-surface 73b inclined upward and inward from the outer end to the root of outer side, on the outer surface opposite to the spool body 20A.

The inner side of the step 24A of the locking groove 24 presses inward the pressed inclined-surface 73b of the locking projection 73 fitted in the locking groove 24 such that the plate 22 is in close contact with the spool body 20A by the mounting ring 70.

That is, the locking projection 73 is formed in a wedge-like shape having a front forcibly-fitted inclined-surface 73a such that both sides are symmetrically inclined inward with respect to the outer end.

Accordingly, the inner side of the step 24a comes in contact with a predetermined position on the pressed inclined-surface 73b regardless of the thickness of the plate as long as the outer end of the locking projection 73 is inserted in the locking groove 24 inside the step 24a. Therefore, there is an effect that the step 24a presses the pressed inclined-surface 73b using the elasticity of the mounting ring 70, so the plate 22 can be more strongly fitted between the mounting ring 70 and the spool body 20A.

In other words, the thicker the plate 22, the closer to the outer end of the pressed inclined-surface 73b the step 24a comes in contact with the locking projection 73.

In contrast, even if the plate 22 is made thin, the step 24a comes in contact with the locking projection close to the root of the outer side of the pressed inclined-surface 73b.

Accordingly, the locking projection 73 functions as a wedge as if it is fitted in the locking groove 24, so the mounting ring 70 presses the plate 22 inward, that is, toward the spool body 20A regardless of a change in thickness of the plate 22, and accordingly, the plate 22 can be kept firmly fitted.

In this case, with the plate 22 is combined with the mounting ring 70, the distance D1 between the inner side (the side facing the spool body 20A0 of the plate 22 and the root of the outer side of the locking projection 73 and the distance D2 between the outer side of the spool body 20A (a contact side 20a with the plate 22) and the inner end of the step 24a satisfies the condition D1≥D2.

A representative embodiment in which the distances D1 and D2 are the same can be seen in FIG. 1.

According to this relationship, the thickness of the plate 22 making the distances D1 and D2 the same is the minimum thickness of the plate 22 in the present invention.

Further, the slope or the height of the pressed inclined-surface 73b that makes the distance D1 larger than the distance D2 is the limit thickness of the plate 22 that can be replaced in the present invention.

Accordingly, as shown in FIG. 4, under the assumption that the distances D1 and D2 are the same and the locking projection 73 does not come out of the locking groove 24, even if the thickness of the plate 22 is increased, the step 24a keeps in contact with the pressed inclined-surface 73b of the locking projection 73, so the plate 22 is kept in close contact with the spool body 22A by the mounting ring 70.

In particular, as described above, since the mounting ring 70 is made of a material having predetermined elasticity in the present invention, the locking projection 33 can be forcibly fitted into the locking groove 24 and the elasticity at the locking projection 73 can be applied only to the plate 22 by contact with the step 24a, so the plate 22 can be firmly maintained regardless of the thickness.

Figure 2A:
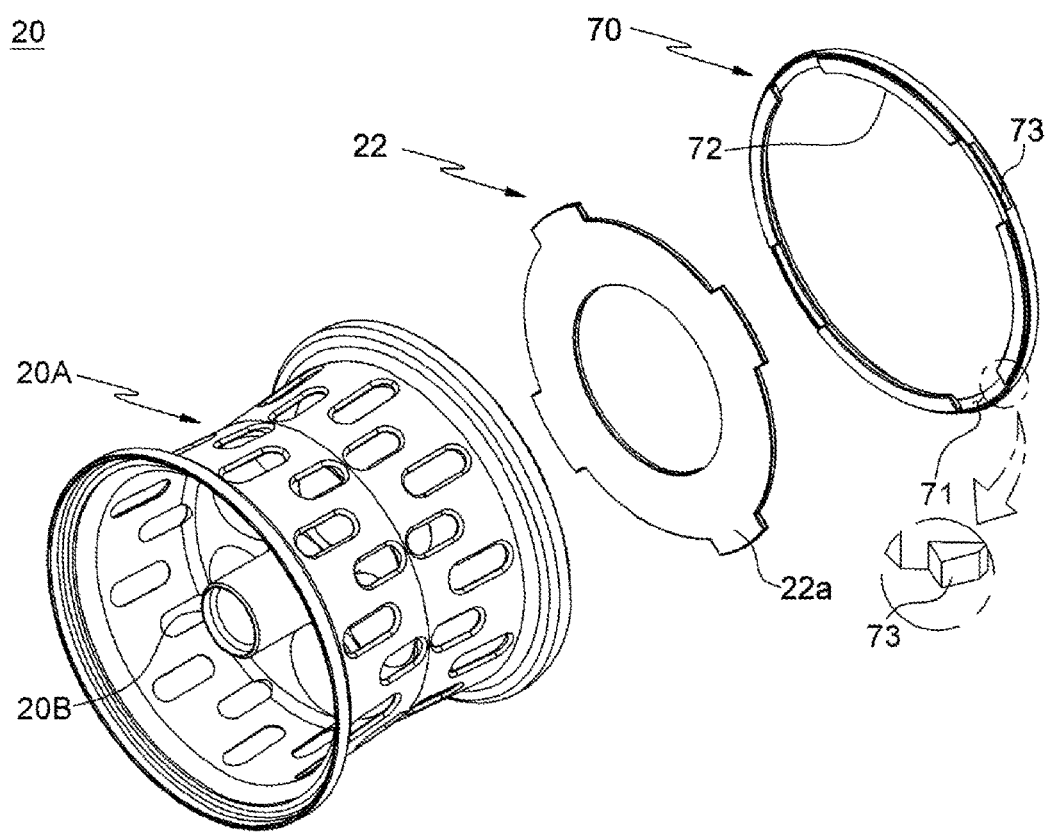
FIGS. 2A and 2B are exploded perspective views of the baitcast reel spool according to the present invention.
Figure 2B:
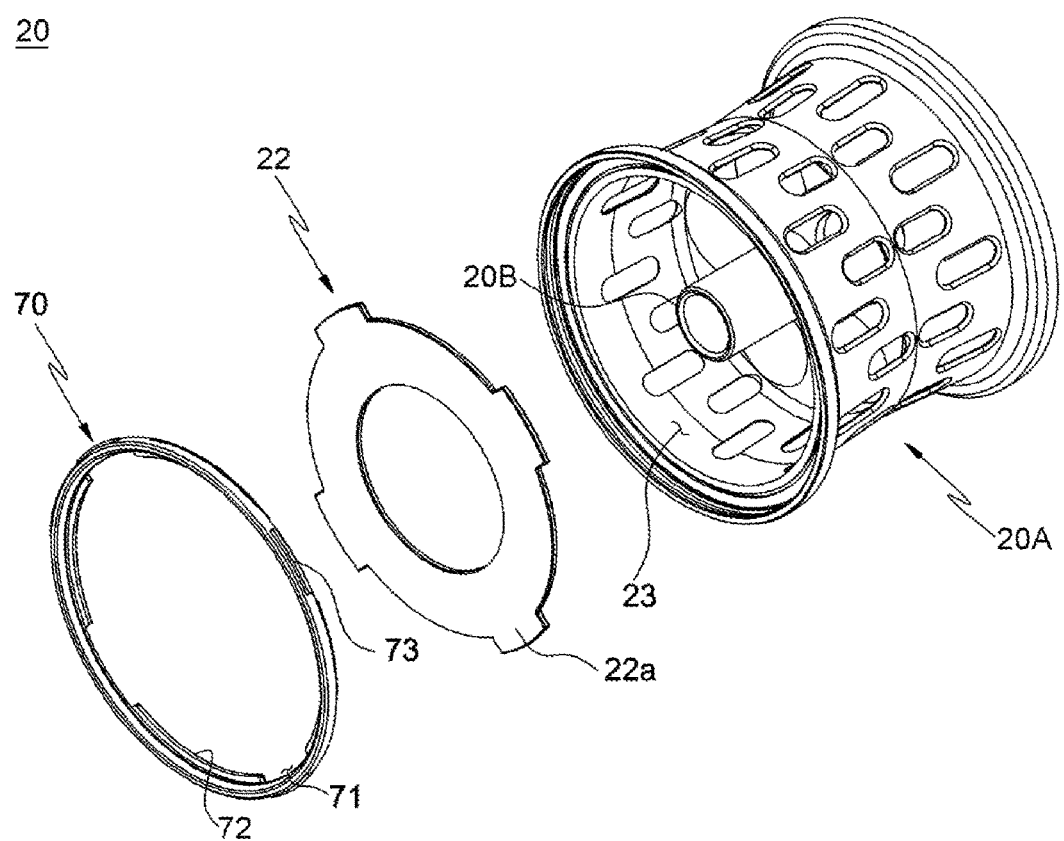

Although the number and position of the locking projections 73 are not limited, the locking projections 73 may be arranged in the same number as the seats 71 to correspond to the seats 72 at one-to-one positions, as shown in FIGS. 2A and 2B.

Although a baitcast reel spool having a replaceable plate has a specific shape and structure was described above with reference to the accompanying drawing, the present invention may be changed and modified in various ways by those skilled in the art and those changes and modifications should be construed as being included in the scope of the present invention.

What is claimed is:

1. A baitcast reel spool having a replaceable plate, the spool comprising:
   a spool body having an opening at a side;
   a plate attached to the opening of the spool body to be attracted by a braking magnet; and
   a mounting ring attached to the opening of the spool body to cover a rim of the plate in order to fix the plate,
   wherein the plate has projections formed around the rim, and the mounting ring has seats to fit the projections therein, on an inner side coming in contact with the plate.

2. The spool of claim 1, wherein the spool body has locking grooves formed on an inner side of the opening,
   the mounting ring has locking projections formed on a rim to be locked into the locking grooves, and
   the plate can be replaced by detaching the mounting ring from the spool body.

3. The spool of claim 2, wherein the locking projections each have a pressed inclined-surface inclined upward and inward from an outer end to a root of an outer side, and
   inner ends of steps of the locking grooves press inward the pressed inclined-surface of the locking projections fitted in the seats, so the plate is in contact with the spool body by the mounting ring.

4. A baitcast reel spool having a replaceable plate, the spool comprising:
   a spool body having an opening at a side;
   a plate attached to the opening of the spool body to be attracted by a braking magnet; and
   a mounting ring attached to the opening of the spool body to cover a rim of the plate in order to fix the plate,
   wherein the spool body has locking grooves formed on an inner side of the opening,
   the mounting ring has locking projections formed on a rim to be locked into the locking grooves, and
   the plate can be replaced by detaching the mounting ring from the spool body.

5. The spool of claim 4, wherein the locking projections each have a pressed inclined-surface inclined upward and inward from an outer end to a root of an outer side, and
   inner ends of steps of the locking grooves press inward the pressed inclined-surface of the locking projections fitted in the seats, so the plate is in contact with the spool body by the mounting ring.

* * * * *